United States Patent Office 3,521,499
Patented July 21, 1970

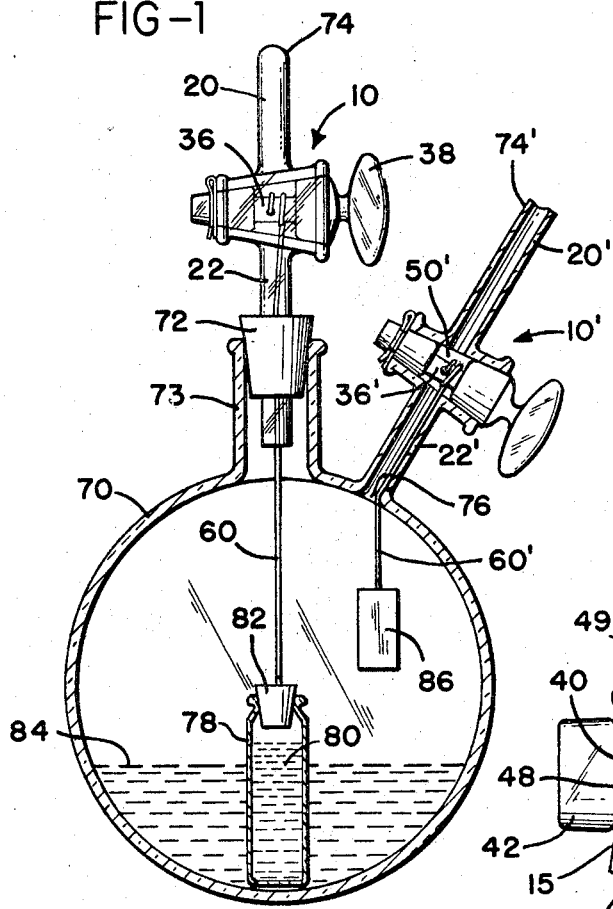
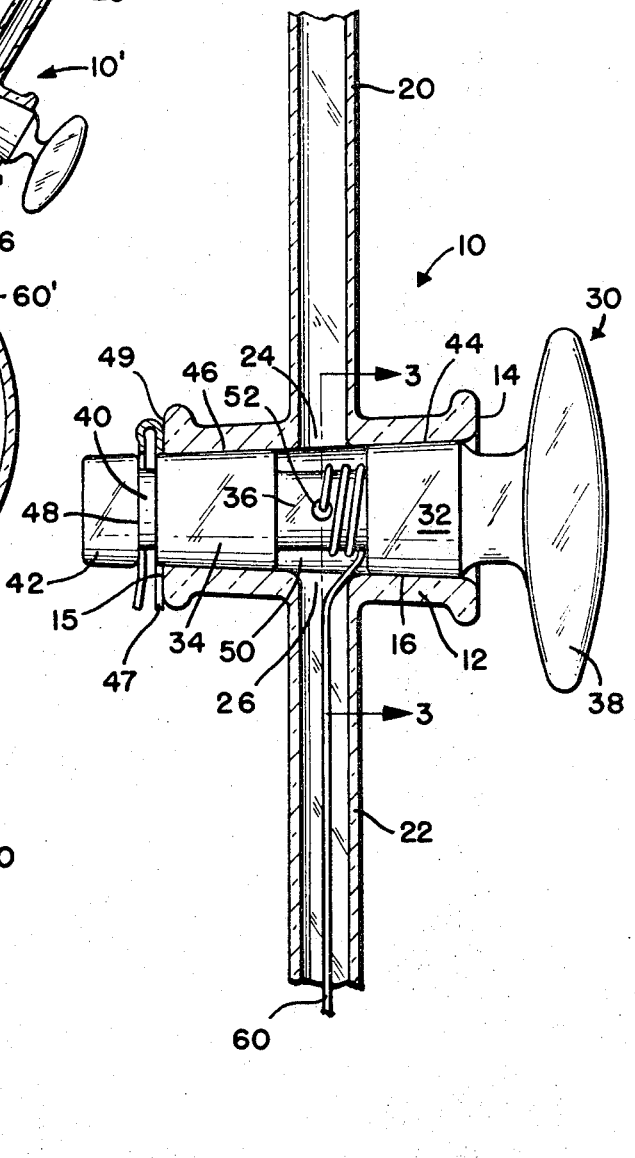
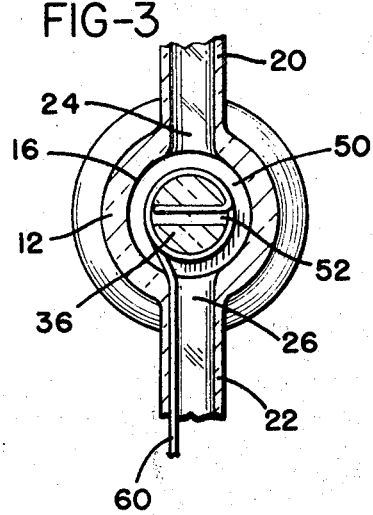

3,521,499
WINDLASS FOR OPERATION IN ENCLOSED VESSELS
Roger H. Keith, 5348 Red Coach Road, Kettering, Ohio 45429
Filed Aug. 22, 1968, Ser. No. 754,636
Int. Cl. F16h 55/32
U.S. Cl. 74—89.2         5 Claims

ABSTRACT OF THE DISCLOSURE

A modified stopcock plug installed in conventional stopcock apparatus for transmitting motion to objects inside a sealed vessel. The middle section of a conventional stopcock plug is reduced in diameter to form a spool-like groove such that rotation of the plug will cause a flexible line or wire attached to the middle section and extending therefrom to such an object to be wound about the groove to effect movement thereof relative to the plug without disturbing the seal.

BACKGROUND OF THE INVENTION

This invention relates to a device for performing chemical, physical, mechanical, optical, electrical, and other operations in a vacuum, under reduced pressures, or in any type of sealed liquid or gaseous environment where mechanical motion inside an enclosed vessel is to be initiated from outside the vessel without violating the integrity of the seal.

Fabrication of apparatus for transmitting mechanical motion to objects within sealed containers has traditionally required the services of an experienced glass blower, or, when such rare artisans were not available, a hodgepodge of cumbersome equipment ingeneously assembled from the spare parts found in a laboratory or machine shop. The necessity of providing a simple means of externally controlling such object has increased as scientific and industrial experimentation and equipment have become more and more sophisticated and elaborate.

SUMMARY OF THE INVENTION

A primary object of the present invention is to provide a device for performing operations in any type of sealed liquid or gaseous environment where mechanical motion inside an enclosed vessel is to be initiated from outside the vessel without violating the integrity of the seal.

An important object of the present invention is to provide a device which is of simple construction and which does not require the services of a glass blower.

Another important object of the invention is to provide a device which can be constructed from conventional stopcock apparatus.

A further object of the invention is to provide a device which will additionally permit fluids to be introduced to and withdrawn from a connected vessel.

These objects are attained by reducing the center portion of a conventional stopcock plug to a spool-like form, leaving the ends of the plug intact to maintain vacuum seal and provide bearing support, and affixing a flexible line or wire to the spool formed in the center of the plug. When threaded through tubing and attached to an object within a sealed container, the line may be wound or unwound about the spool by rotation of the plug, in the manner of a windlass, to effect movement of the object relative to the plug. The stopcock apparatus may be returned to its former function by replacing the modified plug with a conventional plug.

Other objects and advantages of the present invention will be apparent from the following description, the accompanying drawing and the appended claims.

DESCRIPTION OF THE DRAWING

FIG. 1 is a vertical view showing the employment of windlass apparatus constructed according to my invention to manipulate objects in a vacuum jar;

FIG. 2 is a view of the modified plug in sealing engagement with conventional stopcock apparatus, the latter being shown in cross-section; and FIG. 3 is a cross-sectional view taken along line 3—3 in FIG. 2.

DESCRIPTION OF THE PREFERRED EMBODIMENT

As shown in FIGS. 2 and 3, conventional stopcock apparatus generally indicated as 10 is shown as including a hollow glass housing 12 of annular cross-section having a lipped inlet 14, a lipped outlet 15, and an inner circumferential tapered bearing surface 16. Conventionally, such apparatus further includes a pair of axially aligned glass tubes 20 and 22 integrally formed with housing 12 and defining openings 24 and 26 therein.

A modified glass stopcock plug generally indicated as 30 is shown as including a first end portion 32 of circular cross-section and of frustoconical surface configuration, a second end portion 34 of circular cross-section spaced from said first end portion, and having a surface which is, in effect, an axial continuation of the tapered surface of the first end portion 32, and a middle section 36 preferably of circular cross-section integrally formed with and extending between the end portions. A handle member 38 is integrally formed with the end portion 32 and a groove 40 of circular cross-section is integrally formed with the opposite end portion 34. A retainer portion 42 of circular cross-section is integrally formed on the stopcock plug beyond the said groove 40.

The outer circumferential glass bearing surfaces 44 and 46 of the end portions 32 and 34 respectively are ground or lapped for bearing and sealing engagement with the inner circumferential bearing surface 16 of housing 12. A removable spring clip 47 rides the groove 40 and maintains an axial seating pressure on plug 30 by exerting a force against both the sidewall 48 of the retainer portion 42 and the rear face 49 of the housing 12, and thereby prevents expulsion of the plug 30 from housing 12 during use or on application of positive pressure.

The middle section 36 of plug 30 is not an extension of an uninterrupted conical bearing surface as in conventional plugs. Rather, it is preferably formed as a cylinder of reduced diameter providing an annular space or circumferential groove 50 thereabout and giving the appearance of a spool or drum when in cooperating relation with the end portions 32 and 34. These end portions thus retain their original configuration and not only maintain a hermetic seal with housing 12 but also provide trunnion support for middle section 36.

A passage or bore 52 is formed through the middle section 36 generally perpendicular to the axis. A string or wire 60, or any other line sufficiently flexible for winding may be attached to the plug by using cement, solder, by tying a knot, or any other suitable method. The bore 52 is conveniently suited for providing a means for affixing a flexible line or wire 60 to middle section 36. Preferably, therefore, the line 60 is inserted and cemented within the bore 52 (FIG. 3) and permitted to extend downwardly through one of the tubes, such as tube 22 of FIG. 2, for connection to an object within a sealed vessel. Thus, by rotating handle 38, the apparatus may be used to wind or unwind the line 60 about middle section 36 to effect movement relative to the plug 30 and housing 12 of such an object within the vessel.

Typical operations for which the above described windlass apparatus may be employed are illustrated in FIG. 1. As shown, a flask or vacuum jar 70 is adapted to receive the lower tube 22 of stopcock apparatus 10 through a one-hole stopper 72 inserted in the cylindrical neck 73 thereof. The upper tube 20 is closed from the atmosphere at 74. The lower tube 22′ of stopcock apparatus 10′ is shown as being integrally formed in the side of flask 70 at opening 76, while upper tube 20′ is left open at 74′ for connection to a vacuum pump or other environment controlling equipment. An upright bottle 78, containing a chemical reactant 80, is sealed by means of stopper 82 and immersed in the chemical solution 84 within container 70.

The environment within container 70 is controlled by means connected to apparatus 10′ at the outer extremity 74′ of tube 20′. Annular space 50′ permits gaseous or liquid material to be introduced into or withdrawn from container 70 such that any type of liquid or gaseous environment may be maintained therein. As examples, additional chemical solution may be added through apparatus 10′ to container 70, or, the air in container 70 may be withdrawn through apparatus 10′ by means of a vacuum pump attached at 74′.

As illustrated in FIG. 1, line 60 extends from middle section 36 through tube 22 into container 70 where it is attached to stopper 82. Thus, the chemical reactant 80, be it gaseous or liquid, may be exposed to chemical solution 84 by turning handle 38 to wind line 60 about middle section 36 thereby transmitting motion to stopper 82 and removing it from bottle 78.

The modified plug may also be used to transmit motion to an element 86, such as a piece of litmus paper or a corrosion specimen, attached to line 60′. By winding or unwinding line 60′ about middle section 36′ the element 86 may be withdrawn from or lowered into chemical solution 84.

It is to be appreciated that the above illustrations are only two of the many operations which could be performed with the modified plug, and do not in any way limit the scope of the invention. The modified plug is compatible with a wide variety of laboratory and industrial vessels which bear conventional stopcock plugs. It is to be further appreciated that the present invention is not limited to glass stopcock apparatus but may be applied to large industrial equipment similarly constructed of different materials. Another advantage of the instant invention is that the modified plug may be replaced with a conventional plug in order that conventional stopcock operations may be performed.

The modified plug is advantageously of a construction which is rugged mechanically. The spool is supported at both ends and thereby checks inadvertent payout. Use of sealing greases between the mating bearing surfaces acts as a leak preventative and bearing lubricant. Hence, the plug will act as a windlass without the danger of violating the integrity of the seal. Additionally, the invention is advantageously easy to fabricate without experience in glass blowing. The device is therefore easy to obtain for quick utilization in laboratory experimentation.

It is to be further understood that the configuration of the middle section may be sloped, V-shaped, square or any other suitable shape for winding wire thereabout. However, the configuration is preferably a cylinder such that the turns of the line may be evenly distributed thereon. Other configurations of reduced diameter may be utilized if, for example, the stopcock apparatus communicates in slanted relation with the sealed vessel. As shown in FIG. 1, the device is not dependent upon a vertical orientation and can be useful when operated in slanted relation to apparatus 70, since the lower tube 22′ and opening 76 guide the line 60′ vertically within the vessel 70. Also to be appreciated is that any suitable handle means may be used for rotation of the plug on its axis, as for example a crank, should the invention be incorporated in larger and more complicated industrial equipment.

The present invention has been described in detail above for purposes of illustration only and is not intended to be limited by this description or otherwise except as defined in the appended claims.

I claim:

1. Apparatus for providing mechanical windlass motion to items within a vessel sealed from the atmosphere, comprising:
   a hollow housing having an opening of circular cross section and forming an inner circumferential bearing and sealing surface;
   means formed in said housing for defining a passage opening into said housing and adapted to be connected to such vessel;
   a body for insertion within said housing including a first end portion and a second end portion spaced from said first portion, each said portions having a circular cross-section and adapted to form an outer circumferential bearing and sealing surface for engaged relation with said inner circumferential bearing and sealing surface formed by said housing;
   means defining a circumferential spool-like region of reduced diameter in said body between said end portions and opposite said passage;
   a flexible line affixed to said body at said spool-like region and extending through said passage for providing communication between said body and an item to be moved inside such vessel; and
   handle means connected to said body exteriorly of said housing for rotating said body to effect winding of said line on said groove within said body to thereby effect movement relative to said housing of such item.

2. Apparatus as defined in claim 1 wherein said body bearing surfaces are of frustoconical configuration.

3. Apparatus as defined in claim 1 wherein said housing opening is formed to receive a conventional stopcock plug.

4. Apparatus for manipulation of parts in a vacuum chamber or the like, comprising a hollow glass housing, means in said housing for defining an inlet opening thereinto, a glass plug rotatably mounted in said housing having a pair of spaced portions in bearing and sealing relation to said housing, handle means connected to said plug for effecting rotation of said plug in said housing, and a circumferential spool-like region of reduced diameter formed in said plug between said plug sealing portions and opposite said housing inlet defining a windlass adapted to receive a flexible line thereon so that rotation of said plug by said handle means effects movement of parts connected to such line.

5. The apparatus of claim 4 further comprising means in said plug region defining a transverse passage therethrough adapted to receive one end of such line for winding thereabout.

References Cited
UNITED STATES PATENTS

| | | | |
|---|---|---|---|
| 443,155 | 12/1890 | Wallace | 251—294 |
| 605,989 | 6/1898 | Bean | 251—294 |
| 2,200,558 | 5/1940 | Mayers | 251—294 |
| 3,027,910 | 4/1962 | Oliver | 251—294 |

FOREIGN PATENTS

| | | |
|---|---|---|
| 1,198,678 | 6/1959 | France. |
| 623,160 | 7/1961 | Italy. |

WESLEY S. RATLIFF, Jr., Primary Examiner

U.S. Cl. X.R.

251—294